(12) United States Patent
Ikebukuro et al.

(10) Patent No.: US 10,117,423 B2
(45) Date of Patent: Nov. 6, 2018

(54) LINE ROLLER

(71) Applicant: Shimano Inc., Sakai, Osaka (JP)

(72) Inventors: Satoshi Ikebukuro, Osaka (JP);
Shinichi Morimoto, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 194 days.

(21) Appl. No.: 15/292,845

(22) Filed: Oct. 13, 2016

(65) Prior Publication Data

US 2017/0164594 A1 Jun. 15, 2017

(30) Foreign Application Priority Data

Dec. 15, 2015 (JP) ................................ 2015-244297

(51) Int. Cl.
*A01K 89/01* (2006.01)

(52) U.S. Cl.
CPC ............................. *A01K 89/01085* (2015.05);
*A01K 89/011221* (2015.05); *A01K 89/011223* (2015.05)

(58) Field of Classification Search
CPC .............. A01K 89/01; A01K 89/01082; A01K 89/01123
USPC .................................................. 254/393, 902
See application file for complete search history.

(56) References Cited

U.S. PATENT DOCUMENTS

| | | | | |
|---|---|---|---|---|
| 2,722,130 A | * | 11/1955 | Caldwell | B29C 43/00 156/194 |
| 3,279,762 A | * | 10/1966 | Bruns | B66B 15/04 187/254 |
| 4,196,868 A | * | 4/1980 | Puryear | A01K 89/01 242/232 |
| 5,551,546 A | * | 9/1996 | Tabayama | F16D 27/112 192/84.96 |
| 5,792,294 A | * | 8/1998 | Randazzo | B29C 65/00 156/158 |
| 5,855,327 A | * | 1/1999 | Kaneko | A01K 89/0108 242/231 |
| 6,161,786 A | * | 12/2000 | Ohara | A01K 89/0108 242/157 R |

(Continued)

FOREIGN PATENT DOCUMENTS

| | | |
|---|---|---|
| EP | 0916258 A2 | 5/1999 |
| EP | 2316265 A1 | 5/2011 |

(Continued)

OTHER PUBLICATIONS

Extended European Search Report dated May 30, 2017 for EP Application No. 16198789.6, 11 pp.

*Primary Examiner* — Emmanuel M Marcelo
(74) *Attorney, Agent, or Firm* — United IP Counselors, LLC

(57) ABSTRACT

A line roller for guiding a fishing line to a spool of a spinning reel includes a bearing member rotatable about a rotational axis. The line roller also includes a guide member disposed outside the bearing member in a radial direction from the rotational axis. The guide member includes a holding portion and a body. The holding portion is made of a metal or a ceramic. The holding portion is to hold a fishing line. The holding portion extends in a circumferential direction centered about the rotational axis. The body includes a resin, and a guide surface for leading the fishing line to the holding portion.

13 Claims, 7 Drawing Sheets

(56) References Cited

U.S. PATENT DOCUMENTS

| | | | | |
|---|---|---|---|---|
| 6,336,604 B1 * | 1/2002 | Aratake | ............. | A01K 89/0108 242/231 |
| 8,132,789 B2 * | 3/2012 | Graebner | ................ | B66B 15/04 254/371 |
| 8,863,906 B2 * | 10/2014 | Mustalahti | ................ | B66B 7/06 187/251 |
| 9,750,233 B2 * | 9/2017 | Hiraoka | ........... | A01K 89/01081 |
| 2002/0100828 A1 * | 8/2002 | Sugawara | .......... | A01K 89/0108 242/231 |
| 2004/0026676 A1 * | 2/2004 | Smith | ..................... | B66B 15/04 254/393 |
| 2004/0124298 A1 * | 7/2004 | Okada | ................ | A01K 89/0108 242/231 |
| 2004/0206839 A1 * | 10/2004 | Sugawara | .......... | A01K 89/0108 242/231 |
| 2009/0152389 A1 * | 6/2009 | Ochiai | ............... | A01K 89/0108 242/231 |
| 2011/0095118 A1 * | 4/2011 | Hiraoka | ............. | A01K 89/0108 242/230 |
| 2012/0048981 A1 * | 3/2012 | Ohara | ................ | A01K 89/0108 242/230 |
| 2013/0256438 A1 * | 10/2013 | Hiraoka | ............. | A01K 89/0108 242/234 |
| 2014/0312153 A1 * | 10/2014 | Hiraoka | ........... | A01K 89/01085 242/234 |

FOREIGN PATENT DOCUMENTS

| | | | |
|---|---|---|---|
| JP | H05104566 A | | 4/1993 |
| JP | 08280305 A | * | 10/1996 |
| JP | 2002345370 A | * | 12/2002 |
| JP | 2006101704 A | | 4/2006 |

* cited by examiner

LINE ROLLER

CROSS-REFERENCE TO RELATED APPLICATIONS

This application claims priority to Japanese Patent Application No. 2015-244297 filed on Dec. 15, 2015, the entirety of which is hereby incorporated by reference in its entirety.

BACKGROUND

Technical Field

The present disclosure relates to a line roller.

Background Information

A spinning reel includes a spool, a rotor provided with a pair of rotor arms, and a fishing line guide mechanism (also known as a bail arm) pivotally mounted to the tips of the rotor arms (see Japan Laid-open Patent Application Publication No. 2006-101704). The fishing line guide mechanism is a mechanism for guiding a fishing line to the spool. The fishing line guide mechanism includes a bail, a pair of bail support members supporting both ends of the bail, and a line roller.

In general, the line roller includes a guide member and a bearing. The guide member is mounted to the bearing. The guide member is designed to make contact with the fishing line. Hence, the guide member is made of a durable material. Specifically, the guide member is made of a metal such as brass or stainless steel. However, the guide member made of a metal has a large moment of inertia due to its heavy weight. This moment of inertia results in a drawback that the line roller becomes unlikely to follow winding and releasing of the fishing line.

BRIEF SUMMARY

It is an object of the present disclosure to provide a line roller capable of smoothly following winding and releasing of a fishing line.

A line roller according to an aspect of the present disclosure is for guiding a fishing line to a spool of a spinning reel. The line roller includes a bearing member and a guide member. The bearing member rotates about a rotational axis. The guide member includes a holding portion and a body. The holding portion can be made of a metal or a ceramic, and is designed for holding the fishing line. Additionally, the holding portion extends in a circumferential direction. The body includes a guide surface for leading the fishing line to the holding portion. The body can be made of a resin. The guide member is disposed outside from the bearing member in a radial direction.

In the line roller according to the present disclosure, the body of the guide member is made of a resin. Therefore, according to the present disclosure, the guide member has a lighter weight than a well-known guide member made of a metal. As a result, according to the present disclosure, the moment of inertia of the guide member becomes smaller than that of the well-known guide member. This smaller moment of inertia enables the line roller to smoothly follow winding and releasing of the fishing line. Additionally, the guide member is resistant to wear because the holding portion for holding the fishing line can be made of a metal.

The body can include a recess annularly extending in the circumferential direction. Additionally, the holding portion can be accommodated within the recess.

The body can include a first body and a second body disposed away from the first body at an interval in an axial direction. Additionally, the holding portion can be disposed between the first body and the second body.

The holding portion can include an annular groove for holding the fishing line.

The guide surface can tilt relatively to the rotational axis at an angle of 10 to 60 degrees.

The line roller can further include a support member. The support member can be engaged with the guide member while contacting one end surface of the bearing member. The guide member can herein include a contact portion contacting the other end surface of the bearing member. According to the aforementioned construction, the bearing member can be interposed and held between the support member and the contact portion.

Overall, the line roller according to the present disclosure can smoothly follow winding and releasing of the fishing line.

BRIEF DESCRIPTION OF THE DRAWINGS

Referring now to the attached drawings which form a part of this original disclosure.

DETAILED DESCRIPTION OF EMBODIMENTS

Figure 1:
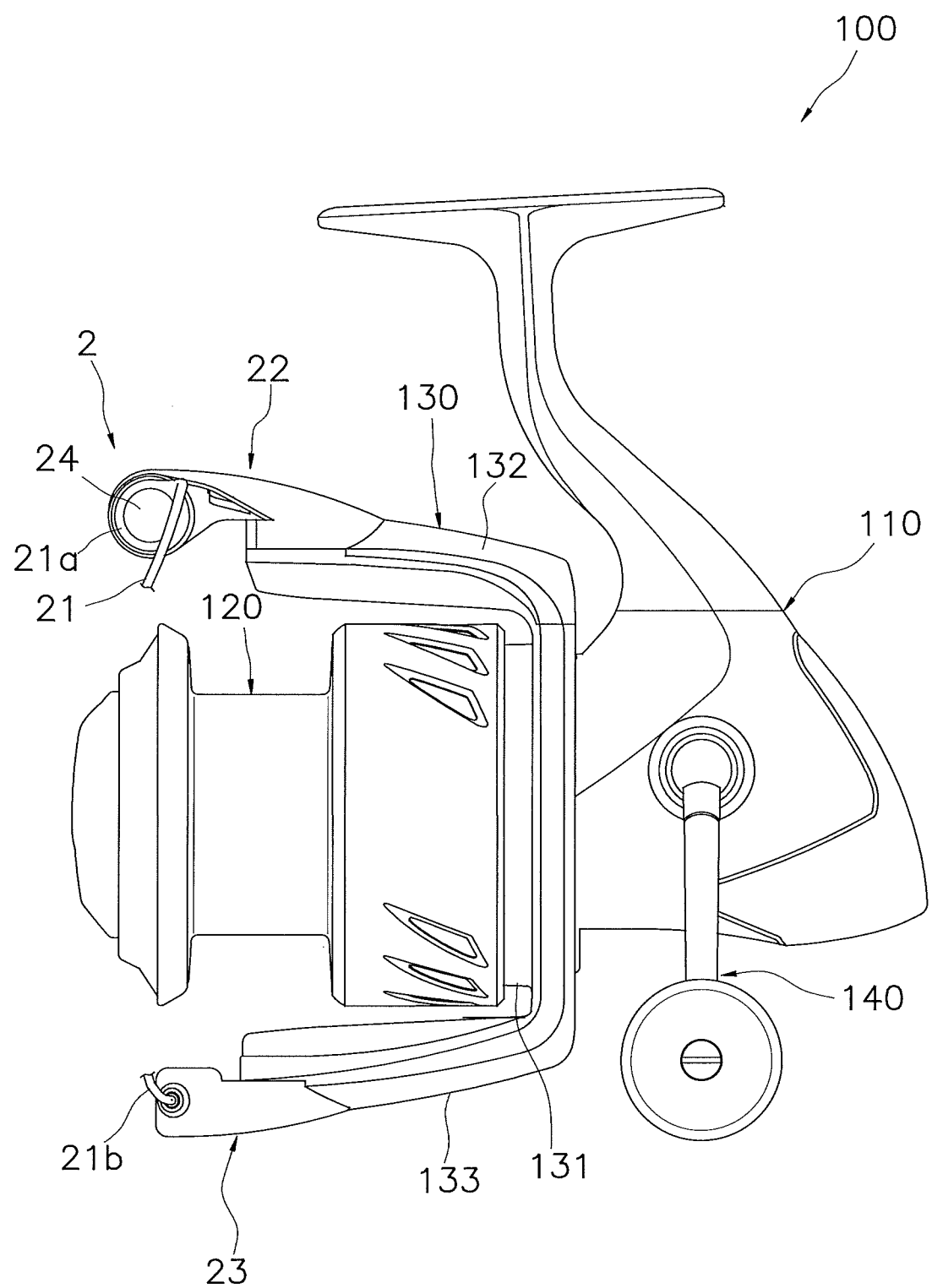
FIG. 1 is a side view of a spinning reel.

A preferred embodiment of a line roller unit according to the present disclosure, and a fishing line guide mechanism using the line roller unit, will be hereinafter explained with reference to the attached drawings. FIG. 1 is a side view of a spinning reel 100.

As shown in FIG. 1, the spinning reel 100 includes a reel unit 110, a spool 120, a rotor 130, a handle 140 and a fishing line guide mechanism 2.

The reel unit 110 includes an accommodation space in its interior, and accommodates a variety of mechanisms in the accommodation space. For example, a mechanism that rotates the rotor 130, a mechanism that moves the spool 120 back and forth, and so forth are accommodated inside the reel unit 110.

The spool 120 is a member about which a fishing line is wound. The spool 120 has a roughly cylindrical shape. The rotor 130 is a member for a winding of the fishing line about the spool 120. When the handle 140 is rotated, the spool 120 reciprocates in the back-and-forth direction, and the rotor 130 rotates about the center axis of the spool 120. Accordingly, the fishing line guide mechanism 2 rotates together with the rotor 130 and guides the fishing line to the spool 120.

When described in detail, the rotor 130 includes a rotor body 131, a first rotor arm 132 and a second rotor arm 133.

The first and second rotor arms 132 and 133 forwardly extend from the outer peripheral surface of the rotor body 131. The first and second rotor arms 132 and 133 are disposed on opposite sides, in the circumferential direction, of the rotor body 131. Additionally, the fishing line guide mechanism 2 is pivotally attached to the first and second rotor arms 132 and 133.

The fishing line guide mechanism 2 is pivotally attached to the rotor 130 to selectively take either a fishing line guiding position or a fishing line releasing position. The fishing line guide mechanism 2 includes a bail 21, a first bail support member 22, a second bail support member 23, a shaft member 24 and a line roller 25 (see FIG. 2).

The bail 21 is a member made of a stainless alloy and has a roughly U shape. The bail 21 outwardly curves in a convex shape along the outer peripheral surface of the spool 120. The bail 21 includes a first end 21a and a second end 21b. When the fishing line guide mechanism 2 returns to the fishing line guiding position from the fishing line releasing position, the bail 21 leads the fishing line to the line roller 25 through the first end 21a.

The first bail support member 22 supports the first end 21a of the bail 21. When described in detail, the first bail support member 22 supports the first end 21a of the bail 21 through the shaft member 24. The first bail support member 22 is attached to the first rotor arm 132. When described in detail, the first bail support member 22 is pivotally mounted to the first rotor arm 132. It should be noted that the first bail support member 22 is pivotally mounted to the outer side of the tip of the first rotor arm 132.

The second bail support member 23 supports the second end 21b of the bail 21. The second bail support member 23 is pivotally mounted to the second rotor arm 133. When described in detail, the second bail support member 23 is pivotally mounted to the outer side of the tip of the second rotor arm 133.

Figure 2:
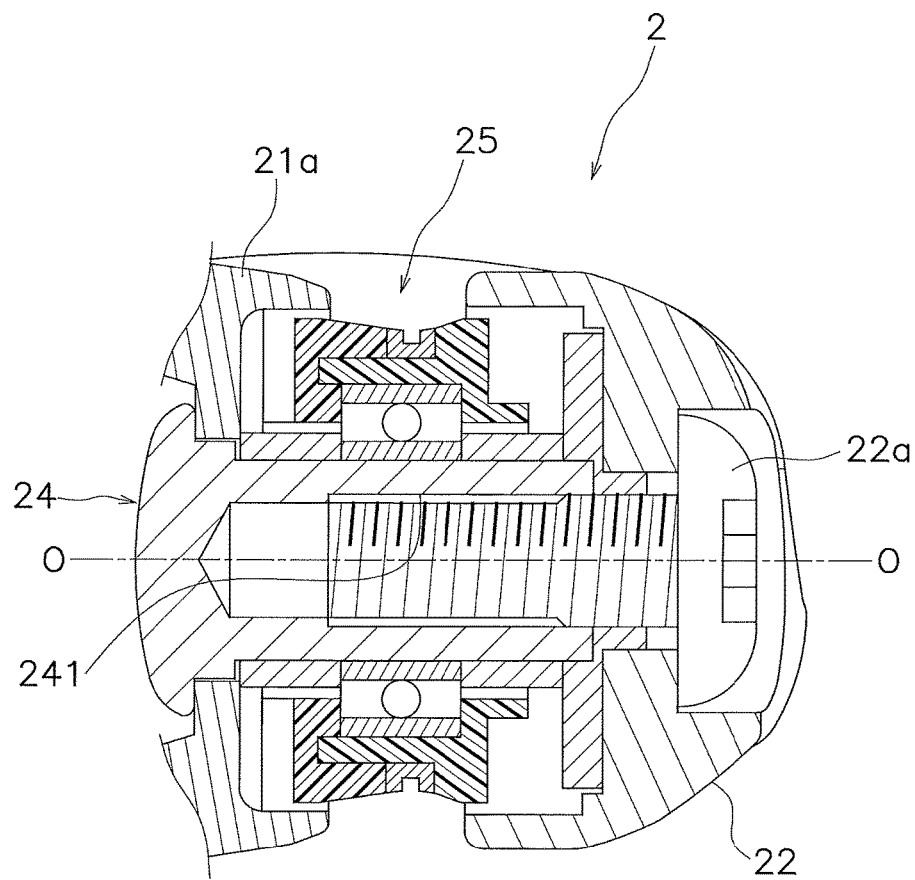
FIG. 2 is a cross-sectional view of a fishing line guide mechanism.

FIG. 2 is a cross-sectional view of the fishing line guide mechanism 2. It should be noted that in the following explanation, the term "axial direction" means a direction extending along a rotational axis O of the line roller 25. In other words, the term "axial direction" means the direction in which the shaft member 24 extends. Specifically, in FIG. 2, the right-and-left direction indicates the axial direction. Additionally, the term "radial direction" means a direction radiating perpendicularly from the rotational axis O. Moreover, the term "circumferential direction" means a circumferential direction along an imaginary circle centered about the rotational axis O.

As shown in FIG. 2, the shaft member 24 extends between the first bail support member 22 and the first end 21a of the bail 21. When described in detail, the shaft member 24 extends from the first end 21a of the bail 21 to the first bail support member 22. Additionally, a bolt 22a extending from the first bail support member 22 is screwed into a through hole 241 of the shaft member 24.

Figure 3:
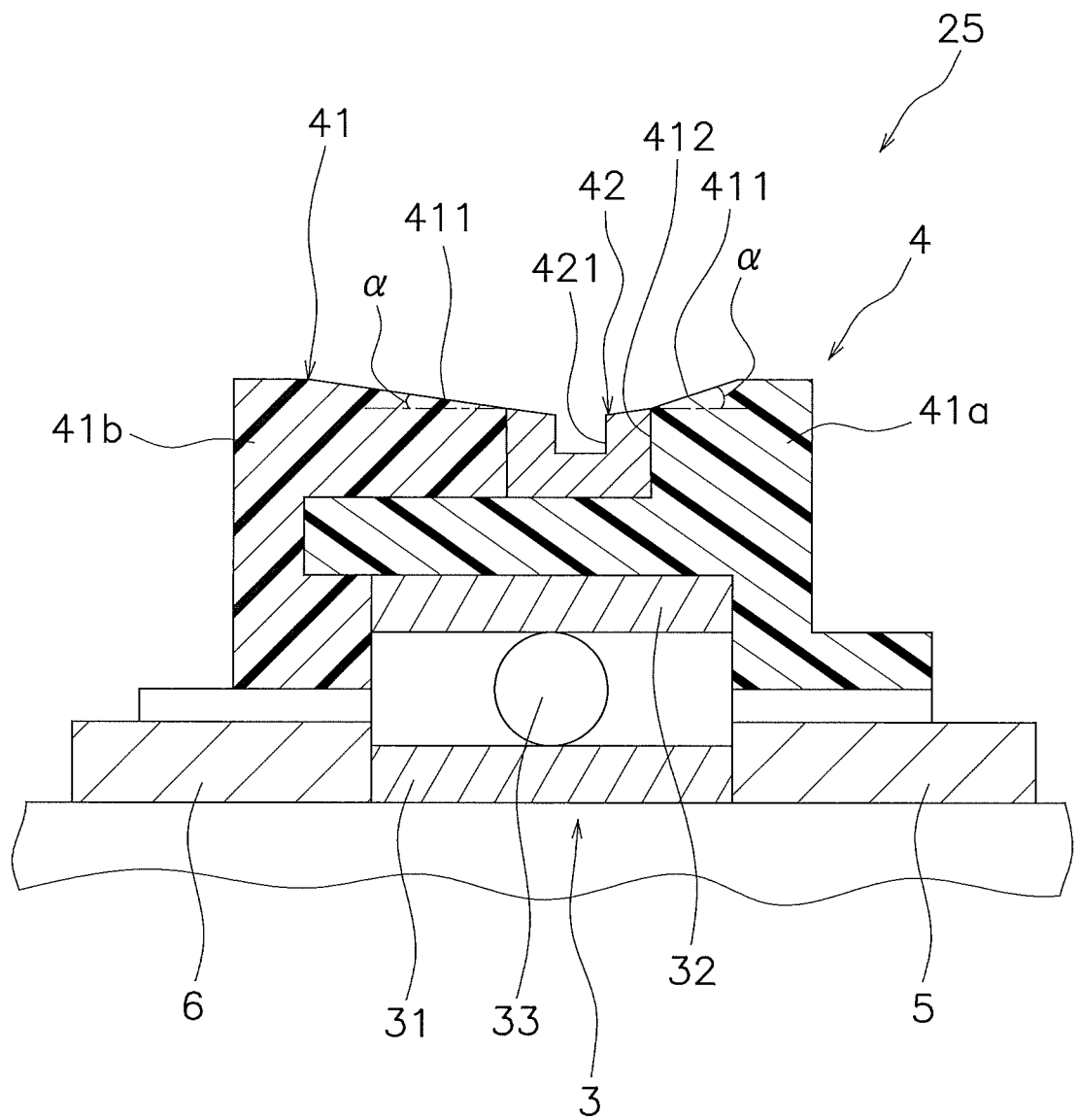
FIG. 3 is a cross-sectional view of a line roller.

FIG. 3 is a cross-sectional view of the line roller 25. The line roller 25 is a member for guiding the fishing line to the spool 120 of the spinning reel 100. As shown in FIG. 3, the line roller 25 includes a bearing member 3 and a guide member 4. Also, the line roller 25 further includes a first restriction member 5 and a second restriction member 6.

The bearing member 3 rotates about the rotational axis O. The bearing member 3 includes an inner race 31, an outer race 32, and a plurality of rolling elements 33. The inner race 31 has a cylindrical shape. The shaft member 24 is fitted to the inner race 31. Therefore, the inner race 31 unitarily rotates with the shaft member 24.

The outer race 32 has a cylindrical shape and has a larger diameter than the inner race 31. The outer race 32 is disposed outside the inner race 31 in a radial direction. The rolling elements 33 are disposed between the inner race 31 and the outer race 32. The rolling elements 33 are disposed at intervals in the circumferential direction. Each of the inner race 31 and the outer race 32 can be made of a metal, such as stainless steel.

The first and second restriction members 5 and 6 are disposed adjacent to the bearing member 3 in the axial direction. When described in detail, the first restriction member 5, the bearing member 3 and the second restriction member 6 are arranged in this order in the axial direction. In other words, the bearing member 3 is disposed between the first restriction member 5 and the second restriction member 6 in the axial direction.

Each of the first and second restriction members 5 and 6 has a cylindrical shape. Each of the first and second restriction members 5 and 6 has an inner diameter substantially equal to that of the bearing member 3. The shaft member 24 penetrates the first and second restriction members 5 and 6.

The first and second restriction members 5 and 6 restrict axial movement of the bearing member 3. Thus, the first and second restriction members 5 and 6 are examples of restricting means. When described in detail, the first restriction member 5 is disposed between the first bail support member 22 and the bearing member 3 in the axial direction. Thus, the first restriction member 5 restricts the bearing member 3 from moving toward the first bail support member 22 (to the rightward in FIG. 2). Additionally, the second restriction member 6 is disposed between the first end 21a of the bail 21 and the bearing member 3 in the axial direction. Thus, the second restriction member 6 restricts the bearing member 3 from moving toward the first end 21a of the bail 21 (to the leftward in FIG. 2).

Each of the first and second restriction members 5 and 6 preferably has a waterproof outer peripheral surface. When a water droplet contacts the outer peripheral surface of the first or second restriction member 5 or 6, a contact angle between the droplet and the outer peripheral surface of the first or second restriction member 5 or 6 is preferably 90 degrees or greater.

To provide each of the first and second restriction members 5 and 6 with the waterproof outer peripheral surfaces, a material with waterproofing properties can be applied to each of the outer peripheral surfaces of the first and second restriction members 5 and 6. Alternatively, each of the first and second restriction members 5 and 6 can be made of a material having waterproof properties. It should be noted that such a material with waterproofing properties can be, for instance, a fluorine resin, a silicone resin or so forth.

The guide member 4 has a tubular shape. The guide member 4 is disposed outside the bearing member 3 in a radial direction. When described in detail, the bearing member 3 is fitted to the guide member 4. The guide member 4 unitarily rotates with the outer race 32 of the bearing member 3. The guide member 4 includes a body 41 and a holding portion 42.

The body 41 has a cylindrical shape. The body 41 is attached to the bearing member 3. The body 41 is made of resin. When described in more detail, the body 41 can be made of at least one of a nylon resin, a polyacetal resin and an ABS resin. The body 41 includes a guide surface 411. The outer peripheral surface of the body 41 functions as the guide surface 411. The guide surface 411 is designed to lead the fishing line to the holding portion 42. Thus, the guide surface 411 is an example of a guiding means. When described in detail, the guide surface 411 tilts from both of its axial ends to the holding portion 42. In other words, the body 41 has an outer diameter that gradually reduces toward the holding portion 42. For instance, a tilt angle α of the guide surface 411 relative to the rotational axis O is preferably from about 10 to 60 degrees. The body 41 includes a recess 412 annularly extending in the circumferential direction. The recess 412 is on the outer peripheral surface of the body 41. The recess 412 is roughly located at a middle of the body 41.

The body 41 includes a first body 41a and a second body 41b. The first body 41a and the second body 41b are fixed to each other. For example, in an exemplary embodiment, the first body 41a and the second body 41b are welded to each other. It should be noted that in order to fix the first and second bodies 41a and 41b, the first and second bodies 41a and 41b can be welded to each other, or alternatively, one of the first and second bodies 41a and 41b can be press-fitted to the other of the first and second bodies 41a and 41b. In another alternative embodiment, the first and second bodies 41a and 41b can be bonded together by an adhesive.

The first body 41a contacts one end surface of the bearing member 3 (the right end surface in FIG. 3). When described in detail, the first body 41a contacts one end surface of the outer race 32. The inner diameter of the first body 41a is smaller than the inner diameter of the outer race 32, and is larger than the outer diameter of the inner race 31. In other words, the first body 41a contacts the outer race 32 without contacting the inner race 31.

The second body 41b contacts the other end surface of the bearing member 3 (the left end surface in FIG. 3). When described in detail, the second body 41b contacts the other end surface of the outer race 32. The inner diameter of the second body 41b is smaller than the inner diameter of the outer race 32 and is larger than the outer diameter of the inner race 31. In other words, the second body 41b contacts the outer race 32 without contacting the inner race 31. The outer race 32 of the bearing member 3 is interposed and held between the second body 41b and the first body 41a.

The first body 41a is disposed at an interval away from the first restriction member 5 in a radial direction. In other words, the inner diameter of the first body 41a is larger than the outer diameter of the first restriction member 5. With the aforementioned construction, when the guide member 4 is rotated about the rotational axis O, the first body 41a is designed to substantially not contact the first restriction member 5. The inner peripheral surface of the first body 41a is opposed to the outer peripheral surface of the first restriction member 5.

The second body 41b is disposed at an interval away from the second restriction member 6 in a radial direction. In other words, the inner diameter of the second body 41b is larger than the outer diameter of the second restriction member 6. With the aforementioned construction, when the guide member 4 is rotated about the rotational axis O, the second body 41b is designed to substantially not contact the second restriction member 6. The inner peripheral surface of the second body 41b is opposed to the outer peripheral surface of the second restriction member 6.

The holding portion 42 is designed for holding the fishing line. The fishing line is guided to the outer peripheral surface of the spool 120 through the holding portion 42 of the line roller 25 during a winding of the fishing line. During the winding of the fishing line, the line roller 25 is entirely rotated together with the holding portion 42 while following the movement of the fishing line. Also, during the winding of the fishing line, the holding portion 42 contacts the fishing line. It should be noted that "holding the fishing line" does not necessarily mean that the fishing line is prevented from being disengaged from the line roller 25 when losing its tension. Rather, "holding the fishing line" means that during winding of the fishing line about the spool 12, a restriction is imposed on the fishing line. The restriction imposed is to an extent that the fishing line is prevented from large movements in the direction of the rotational axis of the line roller 25.

The holding portion 42 has a shape annularly extending in the circumferential direction. The holding portion 42 can be made of a metal or a ceramic. In a preferred embodiment, the holding portion 42 is made of at least one material selected from the group consisting of a stainless steel, brass, an aluminum alloy, a titanium alloy, a silicone compound and an aluminum oxide. The holding portion 42 is constructed as a member separate from the body 41.

The holding portion 42 includes an annular groove 421 for holding the fishing line. The fishing line is held within the holding portion 42. Thus, the annular groove 421 is an example of a holding means. The holding portion 42 is unitarily rotated with the body 41. When described in detail, the holding portion 42 is fixed to the body 41 while being accommodated in the recess 412 of the body 41. Thus, the recess 412 is an example of an accommodating means. Specifically, the holding portion 42 is interposed, and held, between the first body 41a and the second body 41b.

In the exemplary line roller 25 described above, the body 41 of the guide member 4 is made of a resin. This manufacture causes the guide member 4 to have a lighter weight than a well-known guide member made of a metal. As a result, the moment of inertia of the exemplary guide member 4 is smaller than that of the well-known guide member. This smaller moment of inertia enables the exemplary line roller 25 to smoothly follow winding and releasing of the fishing line. Additionally, the guide member 4 is wear resistant because the holding portion 42 for holding the fishing line is made of a metal.

Modifications

A preferred embodiment of the present disclosure has been explained above. However, the present disclosure is not limited to the above embodiment, and a variety of changes can be made without departing from the scope of the present disclosure.

Modification 1

Figure 4:
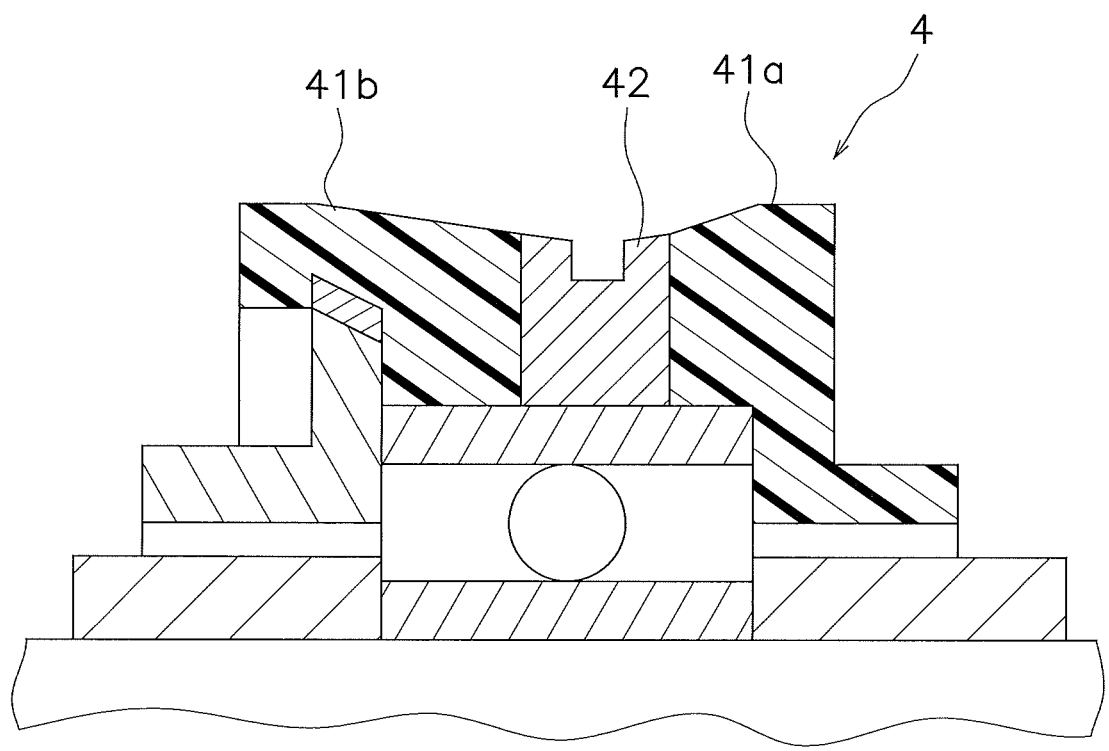
FIG. 4 is a cross-sectional view of a line roller according to a modification.

As shown in FIG. 4, the first body 41a and the second body 41b can be disposed at an interval away from each other in the axial direction. The holding portion 42 is disposed between the first body 41a and the second body 41b. However, the holding portion 42 need not necessarily be fixed to the first body 41a and the second body 41b.

Modification 2

The aforementioned line roller 25 can be modified to not include the first and second restriction members 5 and 6.

Modification 3

Figure 5:
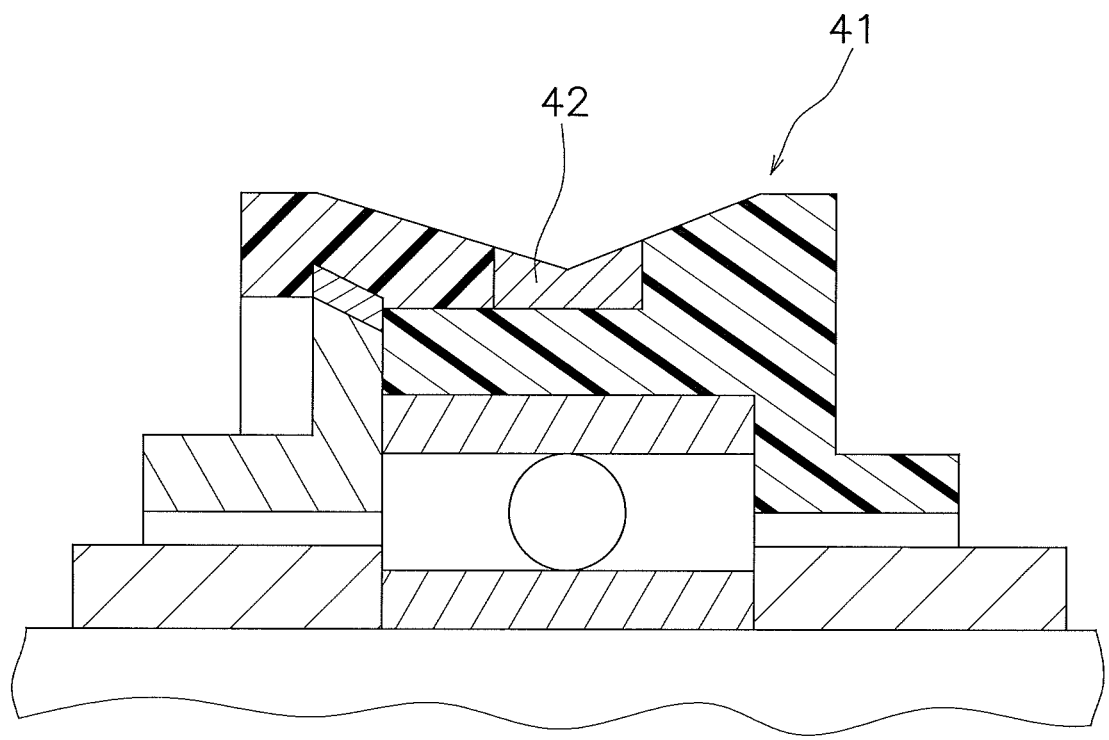
FIG. 5 is a cross-sectional view of a line roller according to another modification.

In the aforementioned preferred embodiment, the groove 421 of the holding portion 42 has a cross-section made in a rectangular shape. However, as shown in FIG. 5, the groove 421 can have a cross-section made in a triangular shape. Alternatively, the groove 421 can have a cross-section made in another shape.

Modification 4

Figure 6:
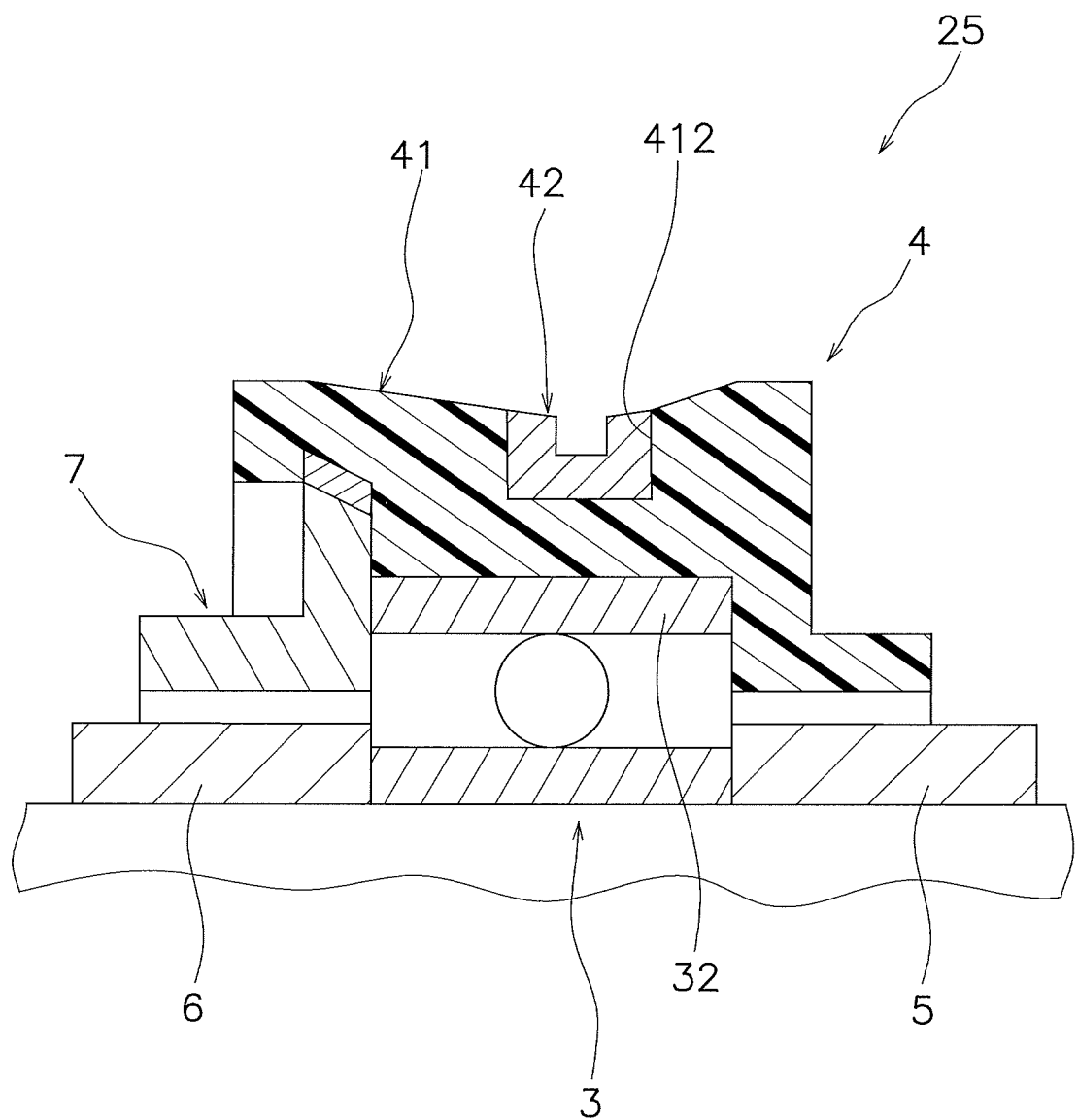
FIG. 6 is a cross-sectional view of a line roller according to yet another modification.

In the aforementioned preferred embodiment, the body 41 is composed of two members, i.e., the first body 41a and the second body 41b. However, as shown in FIG. 6, the body 41 can be composed of a single member. In this modification, for instance, the holding portion 42 can be formed within the recess 412 of the body 41 by insert molding. It is herein preferable for the line roller 25 to further include a support member 7 for interposing and holding the outer race 32 of the bearing member 3 between the support member 7 and the body 41.

The support member 7 has a roughly cylindrical shape. The support member 7 is engaged with the body 41 while in contact with one end surface (the left lateral surface in FIG. 6) of the bearing member 3. With the aforementioned construction, the outer race 32 of the bearing member 3 is interposed and held between the body 41 and the support member 7. It should be noted that the inner diameter of the support member 7 is smaller than the inner diameter of the outer race 32, and is larger than the outer diameter of the inner race 31. In other words, the support member 7 contacts the outer race 32 without contacting the inner race 31.

The support member 7 is disposed at an interval away from the second restriction member 6 in a radial direction. In other words, the inner diameter of the support member 7 is larger than the outer diameter of the second restriction member 6. Therefore, when the support member 7 is rotated about the rotational axis O, the support member 7 is designed to substantially not contact the second restriction member 6. The inner peripheral surface of the support member 7 opposes the outer peripheral surface of the second restriction member 6. The support member 7 can be made of a resin, for instance, and can be thus made of a similar material as the guide member 4.

Figure 7:
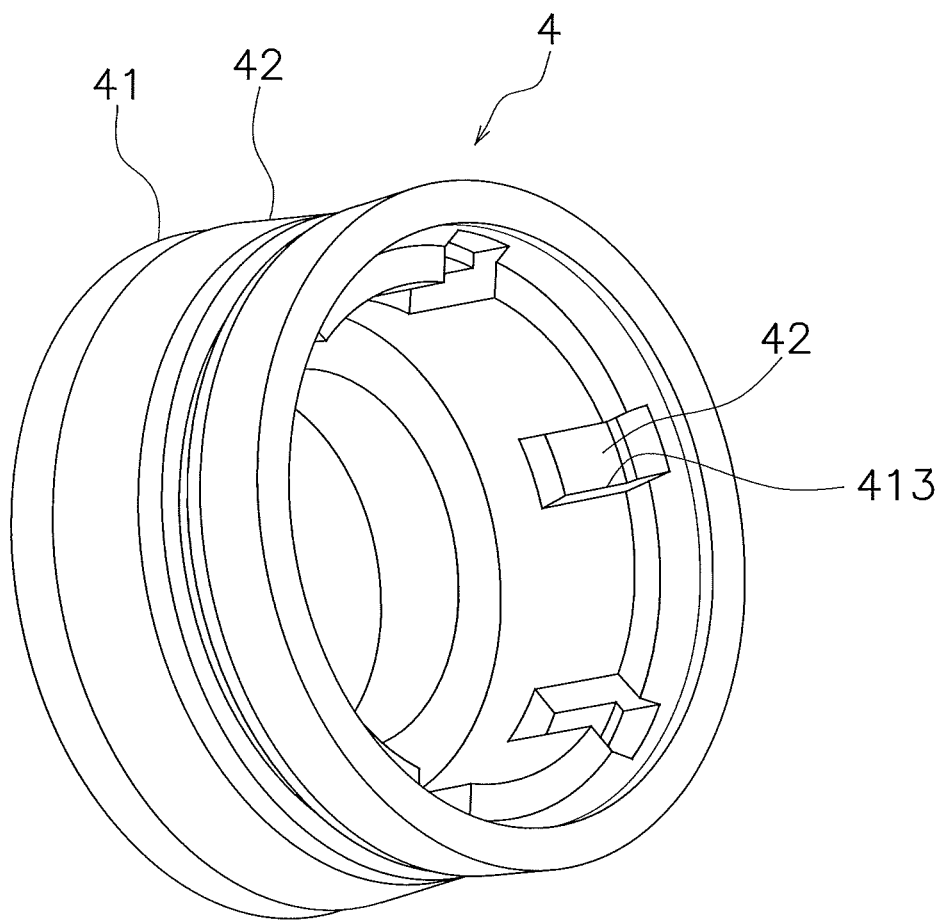
FIG. 7 is a perspective view of a body of a guide member according to further yet another modification.

Additionally, when composed of a single member, the body 41 can include a plurality of openings 413 on its inner lateral surface as shown in FIG. 7. The openings 413 are respectively disposed at intervals in the circumferential direction. The holding portion 42 is exposed through the respective openings 413. In other words, the holding portion 42 can be held through the respective openings 413. With the aforementioned construction, for instance, the holding portion 42 can be held in performing an insert molding.

What is claimed is:

1. A line roller for guiding a fishing line to a spool of a spinning reel, the line roller comprising:
    a bearing member rotatable about a rotational axis; and
    a guide member disposed outside the bearing member in a radial direction from the rotational axis, the guide member including a holding portion and a body, the holding portion made of a metal or a ceramic, the holding portion to hold the fishing line, the holding portion extending in a circumferential direction centered about the rotational axis, the body including a resin, and a guide surface for leading the fishing line to the holding portion.

2. The line roller according to claim 1, wherein the body includes a recess annularly extending in the circumferential direction, and
    the holding portion is accommodated within the recess.

3. The line roller according to claim 1, wherein the body includes a first body and a second body, and
    the holding portion is interposed and held between the first body and the second body.

4. The line roller according to claim 1, wherein the body includes a first body and a second body disposed at an interval away from the first body in a direction parallel to the rotational axis, and
    the holding portion is disposed between the first body and the second body.

5. The line roller according to claim 1, wherein the holding portion includes an annular groove for holding the fishing line.

6. The line roller according to claim 1, wherein the guide surface tilts at an angle of 10 to 60 degrees relative to the rotational axis.

7. The line roller according to claim 1, further comprising:
    a support member engaging the guide member and contacting a first end surface of the bearing member, wherein
    the guide member includes a contact portion contacting a second end surface of the bearing member opposite to the first end surface of the bearing member.

8. The line roller according to claim 1, further comprising:
    a first restriction member abutting the bearing member; and
    a second restriction member abutting the bearing member,
    the bearing member interposed between the first and second restriction members in a direction parallel to the rotational axis.

9. A guide member rotatable about a rotational axis, the guide member comprising:
    a holding portion including a metal or a ceramic, the holding portion having an annular groove and an outermost surface, the holding portion extending in a circumferential direction centered about the rotational axis, the outermost surface being a surface of the holding portion farthest from the rotational axis; and
    a body including a resin, and having a guide surface abutting the outermost surface of the holding portion.

10. The guide member according to claim 9, wherein the body further includes a recess annularly extending in the circumferential direction, and
    the holding portion is accommodated within the recess.

11. The guide member according to claim 9, wherein the body further includes a first body and a second body, and
    the holding portion is interposed and held between the first body and the second body.

12. The guide member according to claim 9, wherein the body further includes a first body and a second body, the first body and the second body abuts the holding portion, and
    the holding portion separates the first body from the second body.

13. The guide member according to claim 9, wherein the guide surface tilts at an angle of 10 to 60 degrees relative to the rotational axis.

* * * * *